United States Patent
Lau et al.

(10) Patent No.: US 11,772,972 B2
(45) Date of Patent: Oct. 3, 2023

(54) GREEN METHOD FOR PRODUCING A MIXTURE OF MULTIPLE NANO-CARBON POLYMORPHS FROM COAL

(71) Applicant: Foshan HL Science & Technology Limited, Foshan (CN)

(72) Inventors: Leo Woon Ming Lau, Foshan (CN); Aixian Shan, Beijing (CN)

(73) Assignee: HL Science & Technology Limited, Hong Kong (CN)

( * ) Notice: Subject to any disclaimer, the term of this patent is extended or adjusted under 35 U.S.C. 154(b) by 275 days.

(21) Appl. No.: 17/274,784

(22) PCT Filed: Sep. 10, 2018

(86) PCT No.: PCT/CN2018/104910
§ 371 (c)(1),
(2) Date: Mar. 9, 2021

(87) PCT Pub. No.: WO2020/051755
PCT Pub. Date: Mar. 19, 2020

(65) Prior Publication Data
US 2022/0048771 A1   Feb. 17, 2022

(51) Int. Cl.
*C01B 32/158* (2017.01)
*C01B 32/182* (2017.01)
(Continued)

(52) U.S. Cl.
CPC ............. *C01B 32/158* (2017.08); *B03B 1/00* (2013.01); *B03B 5/28* (2013.01); *B03B 5/48* (2013.01);
(Continued)

(58) Field of Classification Search
CPC ..... C01B 32/158; C01B 32/18; C01B 32/182; C01B 32/20; B03B 1/00; B03B 5/28;
(Continued)

(56) References Cited

U.S. PATENT DOCUMENTS 5,582,484 A   12/1996 Asa
9,574,151 B2   2/2017 Joseph et al.
(Continued)

FOREIGN PATENT DOCUMENTS

CN   1401561   3/2003
CN   101970350   2/2011
(Continued)

*Primary Examiner* — Richard M Rump
(74) *Attorney, Agent, or Firm* — Andrew D. Fortney; Central California IP Group, P.C.

(57) ABSTRACT

The present disclosure relates to a green method for producing and exploiting multiple nano-carbon polymorphs from coal commonly known as anthracite, meta-anthracite, and semi-graphite. The method disrupts the prevalent environmentally unfriendly practices of burning coal with poor profitability and sustainability because the method yields an unexpectedly rich mixture of high-performance nano-materials, comprising carbon nano-fibers, carbon nano-tubes, carbon nano-onions, nano-graphite-plates, and nano-graphene-disks, by simply mechanically-comminuting coal to nano-size, with minimal sorting efforts. The resulting total-yield of nano-carbon polymorphs is over 50% by weight from properly selected coal. Innovative means are added to the prevalent comminution and sorting practices to further reduce energy and chemical consumption. More importantly, the method also refines the comminution and sorting details for producing the best custom-made formulations. This holistic engineering approach eliminates unnecessary separation and sorting steps because a custom-made formulation typically requires blending the sorted components. Formulations with mixed nano-carbon polymorphs are engineered as new and high-valued-added composite ingredients to critically raise the performance of cement-based, polymer-based, and metal-based composites.

20 Claims, 7 Drawing Sheets

(51) Int. Cl.
  *C01B 32/18* (2017.01)
  *C01B 32/20* (2017.01)
  *B03B 1/00* (2006.01)
  *B03B 5/28* (2006.01)
  *B03B 5/48* (2006.01)
  *B03B 9/00* (2006.01)

(52) U.S. Cl.
  CPC .............. *B03B 9/005* (2013.01); *C01B 32/18* (2017.08); *C01B 32/182* (2017.08); *C01B 32/20* (2017.08); *C01P 2004/13* (2013.01); *C01P 2004/24* (2013.01); *C01P 2004/32* (2013.01); *C01P 2004/64* (2013.01); *C01P 2006/60* (2013.01)

(58) Field of Classification Search
  CPC ....... B03B 5/48; C03B 9/005; C01P 2004/13; C01P 2004/14; C01P 2004/32; C01P 2004/64; C01P 2006/60
  See application file for complete search history.

(56) References Cited

U.S. PATENT DOCUMENTS

| | | | |
|---|---|---|---|
| 9,919,927 | B2 | 3/2018 | Tour et al. |
| 2011/0020646 | A1 | 1/2011 | West et al. |
| 2013/0133247 | A1 | 5/2013 | Kerns et al. |
| 2017/0096600 | A1 | 4/2017 | Tour et al. |
| 2017/0369320 | A1 | 12/2017 | Zhamu et al. |
| 2017/0370009 | A1 | 12/2017 | Zhamu et al. |
| 2018/0016149 | A1 | 1/2018 | Zhamu et al. |
| 2018/0019069 | A1 | 1/2018 | Zhamu et al. |
| 2018/0019071 | A1 | 1/2018 | Zhamu et al. |
| 2018/0019072 | A1 | 1/2018 | Zhamu et al. |
| 2018/0155201 | A1 | 6/2018 | Zhang |

FOREIGN PATENT DOCUMENTS

| | | |
|---|---|---|
| CN | 106432803 | 2/2017 |
| CN | 108359455 | 8/2018 |

(a) $C_{ar77}C_{al94}H_{185}O_{48}N_3SFeCa_2k$ (b) $C_{ar146}C_{al146}H_{232}O_{66}N_3SKNaFeCa_3MgAl$ (c) $C_{ar83}C_{al34}H_{97}O_{26}N$ (d) $C_{ar304}C_{al346}H_{568}O_{109}N_5S_2$ (e) $C_{ar68}C_{al49}H_{128}O_{17}NS$ (f) $C_{ar125}C_{al139}H_{146}O_{23}N_3S_3$ (g) $C_{ar60}C_{al127}H_{78}O_{14}$ (h) $C_{ar73}C_{al49}H_{104}O_{19}N_2$ (i) $C_{ar142}C_{al80}H_{185}O_{17}N_3S_5$ (j) $C_{ar112}C_{al156}H_{134}O_{15}N_2S_2$ (k) $C_{ar436}C_{al127}H_{401}O_{46}N_9S_5$ (l) $C_{ar241}C_{al83}H_{245}O_{17}N_8S$ (m) $C_{ar82}C_{al21}H_{70}O_8$  (n) $C_{ar180}C_{al18}H_{127}O_7N_3S_2$ (o) $C_{ar158}C_{al141}H_{140}O_9N_2$  (p) $C_{ar194}C_{al28}H_{147}$ (q) $C_{ar248}C_{al8}H_{146}O_3NS_2$  (r) $C_{ar140}C_{al16}H_{100}ON$

GREEN METHOD FOR PRODUCING A MIXTURE OF MULTIPLE NANO-CARBON POLYMORPHS FROM COAL

This application is a national phase application of International Appl. No. PCT/CN2018/104910, filed Sep. 10, 2018, incorporated herein by reference in its entirety.

FIELD of THE INVENTION

The present disclosure relates to a method for producing a mixture of multiple nano-carbon polymorphs (comprising more than one nano-carbon polymorphs in the group of carbon nano-fiber, carbon nano-tube, carbon nano-onion, nano-graphene, and nano-graphite-plate) directly from natural coal using physical processes of comminution and separation without any treatments noncompliant to the 12 principles of green chemistry.

BACKGROUND

Carbon is one of the most abundant chemical elements in the Earth's crust. On Earth, most carbon atoms are fully oxidized to form carbon dioxide molecules which are present in the atmosphere or dissolved in various water bodies. Some carbon dioxide molecules are reduced and engineered by many algae and plants into molecules having carbon-carbon, carbon-hydrogen, and carbon-oxygen bonds as the main building-blocks of their organic bodies. In the long history of Earth, the remains of some organic bodies were buried underneath soil and slowly transformed into amorphous carbonaceous solids commonly known as coal, due to the depletion of oxygen and hydrogen driven by natural variations in temperature and pressure. Amorphous carbon is, however, not the most stable allotype of solid carbon. Under a high-temperature and anaerobic condition, amorphous carbon can re-organize its structure and transform itself into crystalline graphite. Under extreme high pressure and high temperature, amorphous carbon and graphite can also transform themselves into diamond crystals. The respective densities of diamond, graphite and coal are 3.5, 2.2, and about 1.0-1.6 g/cm$^3$. The relative degrees of readiness in these natural production processes consequentially influence the prices of diamond (high clarity jewelry-grade about \$15,000/g), graphite (about \$2,000/tonne), and coal (about \$60 per tonne), In addition to these best-known and natural carbon polymorphs, carbon-containing gases/liquids/solids can also be artificially carbonized at high temperature or in an electrical discharge to form carbon fibers and carbon-blacks, solids which are basically a mixture of graphite and amorphous carbon in microstructure. These products have been widely used in the industry for several decades. Recently, the preparation methods of several new nano-carbon polymorphs were invented and these nano-materials promise unusual properties, new applications and market prospects yielding high profits. These emerging carbon nano-crystals (as illustrated in FIG. 1) include carbon nano-onion[2-3], fullerene[4], carbon nano-tube[5-6], carbon nano-fiber[7-8], graphene[9], and nano-diamond[10], and they can all be classified as nano-crystals because they display diffraction signatures. The award of a Nobel price to the demonstration of fullerene and another one to that of graphene well illustrate the importance of these emerging nano-materials. In addition, both carbon nano-tube materials and graphene materials are now mass-produced for various exploitations of their outstanding properties. Their current market prices vary with both form and purity, in the range of \$500-\$10,000 per kilogram. As such, their current prices are much higher than those of coal, graphite, common metals, common polymers, and many engineering materials in industry. This high price implies high profitability but the high-price-perception also seriously stalls the market penetration of these nano-carbon polymorphs as additives and raw materials in any practical production.

In this context, the successes in scientific and technological discoveries of these man-made nano-carbon polymorphs have ironically induced a perception that these nano-polymorphs are costly yet high-value-added artificial engineering materials. On the one hand, such a perception paves and facilitates the high-technology route for the relevant R&D and business development. On the other hand, it blinds the shareholders in this matter from insights related to low-cost production and high-volume applications.

As a way to remove this high-cost barrier against the exploitation of nano-carbon polymorphs, a method to produce graphene flakes in a nano-size (referred therein as nano-graphene or graphene-quantum-dots) from inexpensive coal [11] was recently disclosed by Tour et al. [U.S. Pat. No. 9,919,927; Reference 12]. Several pieces of application-oriented extensions were subsequently disclosed [US2017/0096600A1; References 13-16]. More precisely, the disclosures from this group focus on the production of a specific nano-carbon polymorph comprising nano-graphene (graphene-quantum-dots) with its size typically around 2 nm and its thickness of 1-4 atomic-layers. The earliest disclosure of Tour et al. [U.S. Pat. No. 9,919,927; 12] teaches a specialized production process comprising the oxidative etching of pulverized coal for cleaving and exfoliating such nano-graphene from the carbon-based macromolecule-like structures in coal. In practice, strong acids and oxidizing agents are used to cleave and exfoliated the nano-graphene. As a result, the edges of such nano-graphene are terminated by oxygen-containing functional groups, and strong reducing agents are then required to eliminate the oxygen-containing functional groups. Although this disclosure teaches the production of nano-graphene with a cost lower than those of common graphene production in the trade due to the replacement of graphite powder (\$2,000/tonne) with coal powder (\$60/tonne), the practice of this disclosure suffers from the shortcoming of violating the general "12-principles of green chemistry" [1] in that it employs excessive amounts of nasty chemicals. In addition, the production of only one type of nano-carbon polymorphs, namely nano-graphene, means that the method blindly converts all coal constituents to chemical wastes except for the retention of nano-graphene with a relatively low yield of typically less than 20%. For the production of one tonne of nano-graphene, although the actual cost of coal can be pressed to \$300-500, the wastages in chemicals and energy further add an estimated high cost of over \$10,000. Although the disclosure by Tour and coworkers has sparked a school of followers in validating the method and perfecting the relevant skills, the shortcoming and limitation of the disclosure have not been lifted [US2018/0155201A1, 2018/0019072A1, 2018/0019071A1, 2018/0019069A1, 2018/0016149A1, 2017/0370009A1, 2017/0369320A1, 2017/0096600A1; References 17-26].

These recent exploitations of coal sharing a common plan of producing merely nano-graphene fundamentally miss the versatile and heterogeneous nature of coal. The oversight is partly prompted by the rise of graphene in the market and partly caused by the structural complexity of coal [11, 27-29]. Macroscopically, the heterogeneous nature of coal is well correlated to the heterogeneity of a forest which can indeed conceivably be carbonized into a coal mine. Microscopically, the molecular constitutes in coal are diverse derivatives of molecules in algae and plants, molecules known as carbohydrate, lignin, protein, fat, wax, resin, etc. Following carbonization reactions including deoxygenation and dehydrogenation amid earth' s geological metamorphism spanning millions of years, these molecules are converted to virtually infinite variations of aliphatic and aromatic carbonaceous networks which are randomly cross-linked or condensed to form coal. In fact, in the rich scientific literature of coal, over 134 schematic models have been proposed to describe the molecular structures of coal {for recent reviews, see for example, [27-29]}. Recently, Zhou, et al., [29] carefully examined all these published models and validated among them 18 models with the most updated scientific data about coal, data including compositional properties derived from chromatography, spectroscopy, NMR, and mass spectrometry, and crystalline properties derived from X-ray diffraction (XRD) and transmission electron microscopy (TEM). These 18 validated models are now grouped in FIG. 3 from top to bottom with an increasing coal-maturity which correlates to an increasing aromatic/aliphatic-carbon ratio. Even with this diligent clarification and validation, the most current understanding of the coal structures is still patchy.

Nevertheless, a critically important structural feature can still be deduced from these models in FIG. 3. Commonly, those models with a high concentration of aromatic carbon atoms ($C_{ar}$) comprise graphite-like molecular domains having the short-range-ordering feature with the hexagonal benzyl ring as the basic repetitive unit. Although no crystals with long-range-ordering are present in the models in FIG. 3, the short-range-ordering features with domain sizes of 1-2 nm are present and they still support X-ray and electron diffraction. Indeed, abundant experimental XRD and TEM data from diverse sources of coal consistently conclude the presence of graphite-like nano-crystalline domains with basal-plane-size around 1-2 nm and stacks of 1-3 basal-planes [11-17]. With an oxidative etch to decompose the weak links binding these molecular domains and the non-aromatic constituents in FIG. 3, the formation of nano-graphene flakes with an average flake-size of 1-2 nm are expected. This deductive analysis well tracks the background of the "Tour" method for the production of nano-graphene from coal [11-16]. On the other hand, it also explicitly reveals the shortcomings of such a production method in that all functional constituents except nano-graphene are consumed and converted to chemical wastes, and that environmentally detrimental acids, alkalines, and oxidants are used and disposed.

Some follow-up works sparked by the "Tour" method have indeed attempted to reduce the environmental loads in production. For example, Hu et al. published a report entitled ""Facile and green method towards coal-based fluorescent carbon dots with photocatalytic activity" [20] but the disclosure still requires the use of concentrated peroxide in the proposed production. In fact, the report shows that the digestion of 200 mg of coal powder into the alleged carbon dots of 1-3 nm with (100) graphite-stacks (lattice spacing of 0.21 nm) requires 40 ml of 30 w/w % of $H_2O_2$; this means that about 5 moles of peroxide are ineffectively consumed to digest one mole of carbon in the coal sample for the production of the alleged graphene-like nano-carbon polymorphs. Such a high consumption of peroxide definitely violates the principles of green chemistry and engineering [1].

In yet another follow-up case, Zhamu and Jang disclosed [US2017/0369320A1] that raw anthracite coal powder can be modified with HCl at 50° C. for 4 hours and the rinsed "modified coal powder" was graphitized at 2400° C. for 2 hours under argon before it was ultrasonicated and digested to graphene sheets with 1-5 basal-planes. Although the high temperature treatment clearly violates the principles of green chemistry and engineering, the ultrasonication method is relatively green. However, this disclosure still fails to address the management and utilization of the coal constituents other than the minority constituent of nano-graphene. Due to this unacceptable wastage, this disclosure does not comply to the principles of green chemistry and engineering.

In short, a holistic approach to find all naturally occurring nano-carbon polymorphs in coal and extract them with the lowest environmental loads and the maximum utilization of most constituents of coal is lacking in the current trade. More importantly, sorting and separating the types and sizes of these nano-carbon polymorphs are costly both in production and environmental protection. In practice, many downstream industrial applications, such as composite production, are actually best addressed by engineering appropriate mixtures of such nano-carbon polymorphs. Hence, the holistic approach of exploiting the presence of mixed nano-carbon polymorphs in coal should also be extended to the development of application-specific formulations in which comminution, sorting and extracting individual nano-carbon polymorphs are not required and those processes noncompliant to the principles of green chemistry and engineering are simplified by green processes with minimal comminution and sorting and with properties good enough for the specific applications.

REFERENCES

US Patent Documents

U.S. Pat. No. 9,919,927 Mar. 20, 2018 Tour et al.
U.S. Pat. No. 9,574,151 B2 Feb. 21, 2018 Jeseph et al.
U.S. Pat. No. 5,582,484 Dec. 10, 1996 Asa
2018/0155201A1 Jun. 7, 2018 Zhang
2018/0019072A1 Jan. 18, 2018 Zhamu et al.
2018/0019071A1 Jan. 18, 2018 Zhamu et al.
2018/0019069A1 Jan. 18, 2018 Zhamu et al.
2018/0016149A1 Jan. 18, 2018 Zhamu et al.
2017/0370009A1 Dec. 28, 2017 Zhamu et al.
2017/0369320A1 Dec. 28, 2017 Zhamu et al.
2017/0096600A1 Apr. 6, 2017 Tour et al.

OTHER REFERENCES

1. Anastas and Warner, "Green chemistry: theory and practice", Oxford University Press, 1998, p. 30.
2. Iijima, "Direct observation of the tetrahedral bonding in graphitized carbon black by high resolution electron microscopy, Journal of Crystal. Growth 50 (1980) 675-683.
3. Mykhailiv et al., "Carbon nano-onions: Unique carbon nanostructures with fascinating properties and their potential applications", Inorganica Chimica Acta 468 (2017)49-66.
4. Kroto et al., "C-60—Buckminsterfullerene", Nature 318 (1985)162-163.
5. Iijima, "Helical microtubules of graphitic carbon", Nature 354(1991)56-58.
6. Baughman et al., "Carbon nanotubes—the route toward applications", Science 297(2002)787-792.

7. Endo and Kroto, "Formation of carbon nanofibers", Journal of Physical Chemistry 96(1992)6941-6944.
8. De Jong and Geus, "Carbon nanofibers: Catalytic synthesis and applications", Catalysis Reviews—Science & Engineering 42(2000)481-510.
9. Geim and Novoselov, "The rise of graphene", Nature Materials 6(2007)183-191.
10. Mochalin, et al., "The properties and applications of nanodiamonds", Nature Nanotechnology 7(2012)11-23.
11. D. W. van Krevelen, "Coal: Typology-Chemistry-Physics-Constitution", $3^{rd}$ Ed., Elsevier Scientific, Amsterdam, 1993.
12. Tour and coworkers, "Coal as an abundant source of graphene quantum dots", Nature Communications 4(2013) Article #2943
13. Tour and coworkers, "Boron- and nitrogen-doped graphene quantum dots/graphene hybrid nanoplatelets as efficient electrocatalysts for oxygen reduction" ACS Nano 8(2014)10837-10843
14. Tour and coworkers, "Bandgap engineering of coal-derived graphene quantum dots", ACS Applied Materials & Interfaces 7(2015)7041-7048
15. Tour and coworkers, "Intrinsic and extrinsic defects in a family of coal-derived graphene quantum dots", Applied Physics Letters 107(2015) Article #212402.
16. Tour and coworkers, "Luminescent polymer composite films containing coal-derived graphene quantum dots", ACS Applied Materials & Interfaces 7(2015)26063-26068
17. Dong et al., "Graphene quantum dots, graphene oxide, carbon quantum dots and graphite nanocrystals in coals", Nanoscale 6(2014)7410-7415.
18. Hu et al., "Chemically tailoring coal to fluorescent carbon dots with tuned size and their capacity for Cu(II) detection", Small 10(2014)4926-4933.
19. Pakhira et al., "Extraction of preformed graphene oxide from coal: its clenched fist form entrapping large molecules", RSC Advances 5(2015)89066-89072.
20. Hu et al., "Facile and green method towards coal-based fluorescent carbon dots with photocatalytic activity", Applied Surface Science 378(2016)402-407.
21. Zhang et al., "Construction of hierarchical porous carbon nanosheets from template-assisted assembly of coal-based graphene quantum dots for high performance supercapacitor electrodes", Materials Today Energy 6(2017) 36-45.
22. Das et al., "Promising carbon nanosheet-based supercapacitor electrode materials from low-grade coals", Microporous and Mesoporous Materials 253(2017) 80-90.
23. Das et al. "Nanodiamonds produced from low-grade Indian coals", ACS Sustainable Chemistry & Engineering 5(2017)9619-9624.
24. Manoj et al., "Tunable direct band gap photoluminescent organic semiconducting nanoparticles from lignite", Scientific Reports 7(2017) Article #18012
25. Manoj et al., "Facile synthesis of preformed mixed nano-carbon structure from low rank coal", Materials Science-Poland 36(2018)14-20
26. Xu et al., "Coal-derived nitrogen, phosphorus and sulfur co-doped graphene quantum dots: A promising ion fluorescent probe", Applied Surface Science 445(2018)519-526.
27. Marzec, "Towards an understanding of the coal structure: a review", Fuel Process Technology 77(2002)25-32.
28. Mathews et al. "The molecular representations of coal—a review", Fuel, 96(2012)1-14.
29. Zhou et al. "Examination of structural models and bonding characteristics of coals", Fuel 184(2016)799-807, and references cited therein.
30. McCartney and Ergun, "Electron microscopy of graphitic crystallites in meta-anthracite", Nature 206(1965) 962-963.
31. Sun et al., "Reductive alkylation of anthracite: Edge functionalization", Energy & Fuel (2011)3997-4005.
32. Kumanek et al., "Multi-layered graphenic structures as the effect of chemical modification of thermally treated anthracite", Fullerenes, Nanotubes and carbon Nanostructures 26(2018)405-416.
33. Bratek et al., "Properties and structure of different rank antracites", Fuel 81(2002)97-108.
34. Oberlin and Terriere, "Graphitization studies of anthracites by high resolution electron microscopy", Carbon 13(1975)367-376.
35. Oberlin and coworkers, "A possible mechanism for nature graphite formation", International Journal of Coal Geology 1(1982)283-312.
36. Li et al., "Nanomilling of drugs for bioavailability enhancement: a holistic formulation-process perspectives", Pharmaceutics 8(2016) Article #17, 1-35.
37. Nunez et al., "Colloidal petcoke-in-water suspensions as fuels for power generation", Energy & Fuels 26(2012) 7147-7154.

SUMMARY

Nano-carbon polymorphs comprise a family of carbon-based nanomaterials which include carbon onion[2-3], fullerene[4], carbon nano-tube[5-6], carbon nano-fiber[7-8], graphene[9], and nano-diamond[10]. They are commonly perceived as expensive man-made engineering products promising high profitability. This stereotype perception considerably stalls the synergetic development of their high-volume market-demands and low-cost mass-production. The present disclosure unleashes these limitations by confirming the natural presence of multiple nano-carbon polymorphs in inexpensive coal and by teaching a set of environmental-friendly and inexpensive processes for extracting them from coal with minimal changes of their intrinsic nature and functionalities, and for blending such extracts to yield product-formulations having the most cost-effective application-specific performance.

The present disclosure unveils a set of disruptive concepts and skills to holistically facilitate the production and applications of multiple nano-carbon polymorphs from coal via the prevalent green production protocols:
1. Multiple nano-carbon polymorphs are present naturally and abundantly in inexpensive coal, particularly in anthracite and meta-anthracite.
2. Nano-graphene-like polymorphs represent only one group of nano-carbon polymorphs in coal but there are many other nano-carbon polymorphs which can be extracted from coal and be exploited properly. Examples of such other nano-carbon polymorphs include carbon nano-fiber, carbon nano-tube, carbon nano-onion, and nano-graphite plate.
3. The known methods taught by Tour and coworkers, and other groups for oxidation and chemical exfoliation of nano-graphite in coal to produce graphene-quantum-dots require the consumption of strong acids and oxidizing agents. Virtually all of these methods also require heating. These chemical and thermal processes violate the principles of green chemistry and engineering. These processes also incur high costs.

4. All known methods for producing nano-graphene (graphene-quantum-dots) from coal mistakenly neglect the value of the coal constituents other than nano-graphene. As such, they commonly use oxidative chemicals and thermal energy to turn most coal constituents into chemical wastes and environmental pollutants. This mal-practice also incurs high costs.

5. The present disclosure addresses these shortcomings and negligence by taking a holistic and green approach for the disruptive exploitation of coal for high financial yields and low environmental load.

6. The present disclosure relates to a green method for the production of multiple nano-carbon polymorphs in coal. The method reveals a set of inexpensive and environmentally-friendly physical processes which comprise pulverization, comminution and separation, with minimal alternation of the nature of these nano-carbon polymorphs in coal. The adoption of green and physical processes in extracting and separating nano-carbon polymorphs from coal maximizes the functional and economical values of most constituents in coal and minimizes the environmental load and wastage in production.

7. The present disclosure also relates to a green method for exploiting multiple nano-carbon polymorphs in coal. The method exploits multiple nano-carbon polymorphs as a mixture to reduce the costs and environmental loads in separation and purification. Composite-applications of nano-carbon polymorphs typically give optimal performance when multiple morphologies and sizes are adopted in product engineering. Such composite-applications include nano-carbon-polymorphs-reinforced aluminum composites and nano-carbon-polymorphs-modified cement-composites. Some of these applications require no sorting or minimal sorting.

8. In the present disclosure, coal is selected from the group consisting of anthracite, meta-anthracite, semi-graphite, and combinations thereof. The abundant presence of multiple nano-carbon polymorphs in these specific coal sources but not in other coal sources has been verified in the course of developing the present disclosure by Applicants of the present disclosure. In all low-rank-coal, carbon atoms are not yet fused to nano-carbon polymorphs; hence, although the group of Tour and coworkers and other groups allege that these coal sources are suitable for the production of graphene quantum dots, the use of these low-rank coal sources to produce nano-carbon polymorphs will certainly give a low yield, high chemical wastage, and high cost. In addition, although Applicants have indeed found abundant nano-carbon polymorphs in man-made coke, artificially graphitized coal, and other derivatives of coal, these carbon sources require thermal, electrical, and/or chemical modifications of coal are irrelevant to the present disclosure when their productions are noncompliant to the principles of green chemistry and green engineering. In short, the present disclosure properly selects anthracite and meta-anthracite as the most appropriate coal for the production of nano-carbon polymorphs.

In some embodiments, the present disclosure pertains to processes of extracting nano-carbon polymorphs from coal. In some embodiments, the processes comprise mechanical pulverization of coal into micron size powder. In some embodiments, the processes comprise mechanical pulverization of micron-size-coal with the addition of common micro-grinding-beads or common nano-grinding-grits to produce nano-grains of coal. In some embodiments, wet-comminution techniques are adopted to produce nano-grains of coal. In some embodiments, common hydrodynamic cavitation techniques are adopted to produce nano-grains of coal. In some embodiments, the nano-carbon polymorphs are separated from the resultant nano-grains of coal by differentiation in density and wettability.

In some embodiments, the separation process comprises flotation, flocculation, straining, sieving, filtration, dialysis, centrifugation, and combinations of such steps. In some embodiments, the sorted constituents are recombined to yield the best functional performance for a specific downstream-industrial-application. In some embodiments, the comminuted sub-micron constituents are chemically modified with the minimal environmental load before they are used individually or as a mixture to yield the best functional performance for a specific downstream-industrial application.

DETAILED DESCRIPTION OF THE INVENTION

Figure 1:
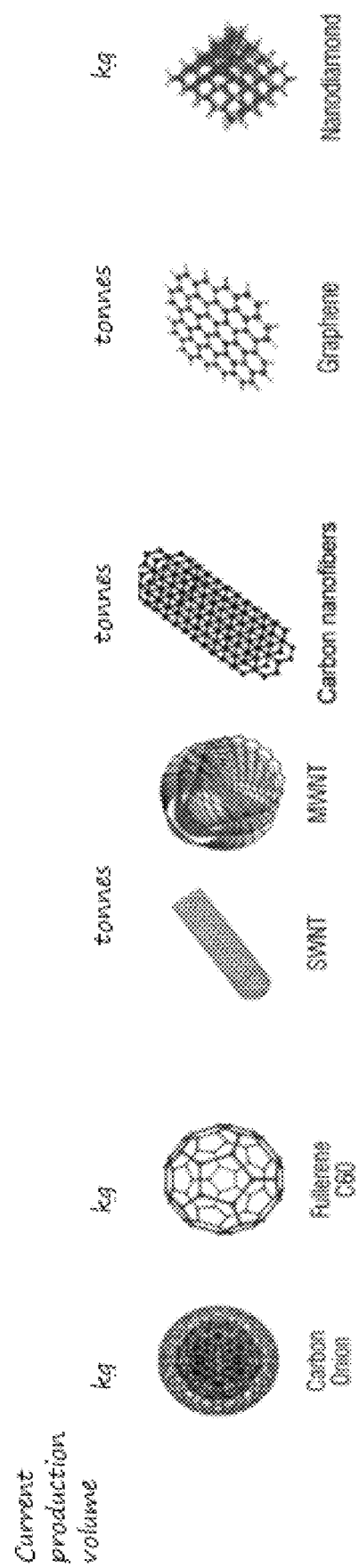
FIG. 1 Commonly-known nano-carbon polymorphs

Coal was formed with an age as old as 200-400 million years and has been a major and rich natural resource for human. However, the prevalent utilization of coal is burning merely for its energy contents with little attention to the other values in coal and to the environmental loads incurred by burning coal. A revolutionary social conscience has recently emerged to curb such misuse and mismanagement of coal. Ideally, most of the current energy production by burning coal should be replaced with clean energy production by harvesting solar, hydro, and wind energy. When this green energy management becomes prevalent, coal can then be preserved as raw materials for green chemical engineering of high-value-added carbon-based products. To implement such an ideal, innovative science and technology must be developed for the articulation of the diverse variations in coal's physical/chemical nature, and for the green extraction and applications of all functional constituents in coal. The present disclosure is developed with this mission of using and managing the coal resources on earth in compliance to the principles of green chemistry and engineering. As such, the contents of green chemistry and engineering in the disclosure must first be clarified.

Among the well-known 12 principles of green chemistry [1], those most relevant to the present disclosure are summarized and articulated as follows:
  Preventing waste;
  Incorporation of all materials used in the production process into the final products;
  Energy requirements are minimized, with the elimination of heating/pressuring procedures, and with the consideration of energy requirements incurred in the production of raw materials.

The present disclosure relates to a green method for extracting and exploiting the high-value-added nano-carbon polymorphs in coal, and the method starts with the process of selecting a proper coal source. In compliance to the principles of green chemistry and engineering, the present disclosure picks only certain types of coal for the production of nano-carbon polymorphs. Made-made coke, artificial graphitized coal, carbon black, activated carbon, and any derivatives of coal with considerable environmental loads are not selected because of the high energy consumption and environmental load in their product life-cycles. Natural graphite is not selected because it is well known that a high energy barrier of about 1000 kJ/mol is present against the conversion of coal and coal-like materials to graphite; as such, the cleavage and exfoliation of graphite to nano-carbon polymorphs must also be energy intensive procedures and should be excluded. Similarly, the disclosure rejects those coke, carbon black, activated carbon, and derivatives of coal whenever they comprise large micron-size graphite domains because breaking these domains down to nano-carbon polymorphs are energy-consuming. Members of low-rank coal like peat, sub-bituminous coal, bituminous coal, and lignite are not included because they contain too many aliphatic C—C, C—O, C—H, C—S, C—N, and C—P bonds, and the cleavages of them, together with the diffusion and re-organization of the resultant carbon atoms towards the formation of nano-carbon polymorphs, requires high energy consumption and imposes environmental loads.

With these considerations, the present disclosure goes against the prevalent choices of a broad range of coal ranks in the production of nano-graphene and graphene-quantum-dots and is discriminating in selecting its raw materials. Specifically, the present disclosure favors the group of anthracite, meta-anthracite, semi-graphite, and combinations thereof. Under the ISO 11760 coal classification, anthracite and meta-anthracite are named Anthracite C, Anthracite B, and Anthracite A. In this classification, meta-anthracite is grouped into Anthracite A, and Anthracite B is a mixture of anthracite and meta-anthracite. Semi-graphite is not well-defined in the literature and is technically referred in the present disclosure as meta-anthracite having more nanometer- and micron-size graphite contents than Anthracite A. More specifically, in ISO 11760, Anthracite A is defined as anthracite with mean random vitrinite reflectance of 4-6% (mean maximum vitrinite reflectance of up to 8%); in this context, the present disclosure refers semi-graphite as anthracite with mean random vitrinite reflectance of 6-10%. Coal with such unusually high reflectance is present in coal-beds around the world, and is still referred as anthracite in China.

The global reserve of anthracite and meta-anthracite is huge, with rich deposits in all continents. Hence, the transformation of them to high-performance nano-carbon polymorphs and application-specific formulations comprising such nano-carbon polymorphs with green and low-cost processes will certainly disrupt the present coal industry and fundamentally change the financial and social issues relevant to coal.

In the course of developing the present disclosure, Applicants have indeed diligently verified with high resolution TEM analyses the presence of multiple nano-carbon polymorphs in coal. Specifically, Applicants have verified, with experimental data articulated in Examples 1 and 2 in the present disclosure, that Anthracite A typically has a high concentration (more than 50% in volume) of multiple nano-carbon polymorphs comprising more than one polymorphs from the group of carbon nano-fiber, carbon nano-tube, carbon nano-onion, nano-graphene, and nano-graphite plate. With the same analysis method, Applicants have also verified that Anthracite C typically has abundant nano-graphene, with other nano-carbon polymorphs as minor polymorph constituents. In short, the selection of special sources of coal is very important in producing multiple nano-carbon polymorphs in coal with the lowest environmental loads and with the best product performance at low costs. These results and conclusion are new and break the ground of the prevalent knowledge about coal. Technically, since measurements of reflectance are simple, fast and low-cost, they can be integrated in automated production as a real-time in-line coal-selection means.

Figure 3:
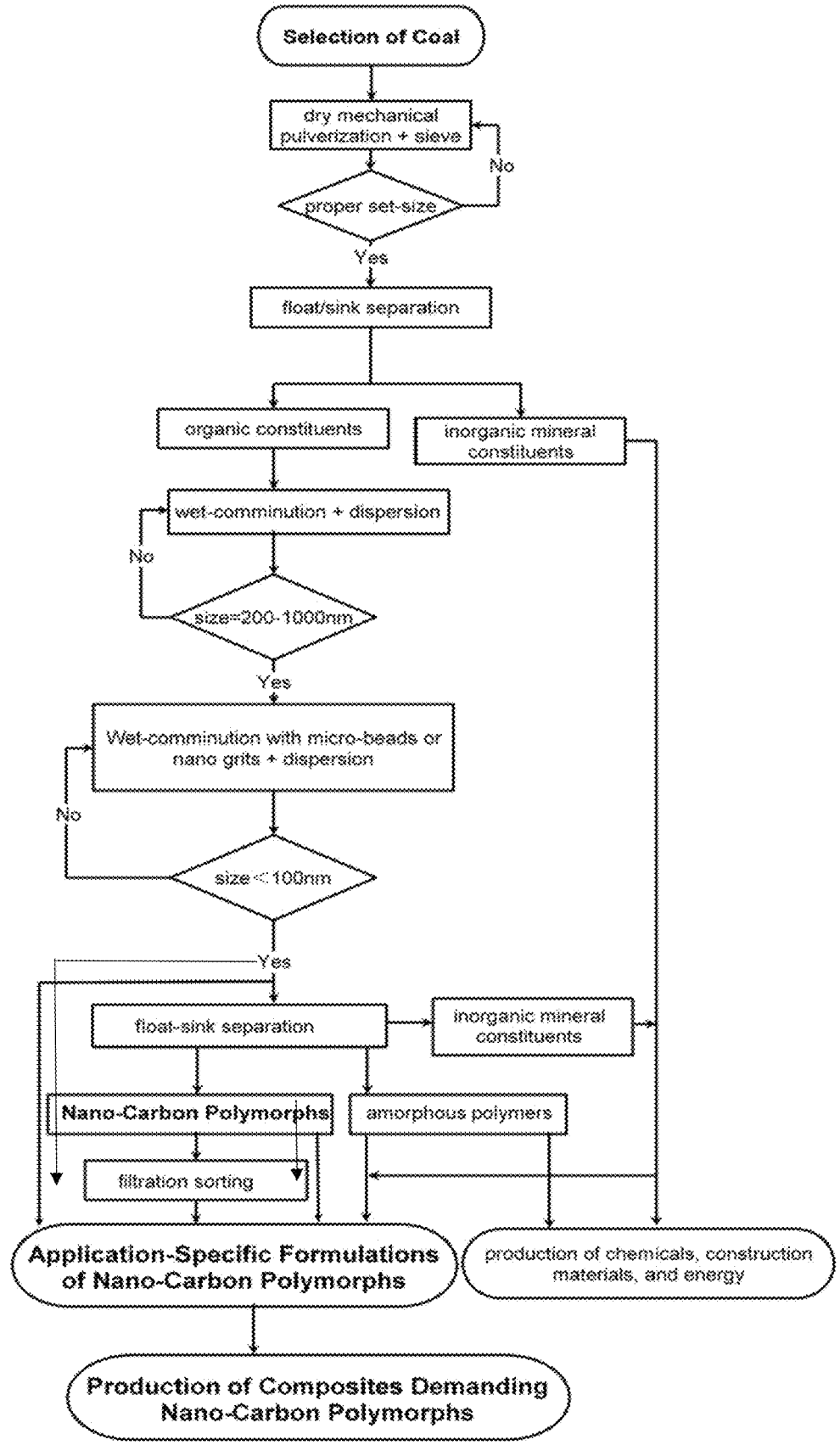
FIG. 3 A scheme of a green and low-cost method for producing nano-carbon polymorphs from coal and exploiting the best value of most constituents of coal with the lowest environmental load FIG. 4 A high resolution TEM (HRTEM) image of a nano-grain of coal comprising a mixture of turbostratic carbon nano-crystals with the presence of carbon nano-onions, carbon nano-fibers, and a hexagonal nano-graphene. The majority of lattice fringes show lattice spacing of 0.32-0.39 nm. The chemical elemental identification by energy dispersive X-ray spectroscopy in the scanning TEM mode confirms the presence of carbon. The nano-grain of coal was found from the diluted slurry prepared by simply grinding two pieces of coa.1

The present disclosure is novel because the main-stream literature of coal has taught against the contemplation of the presence and the production of multiple nano-carbon polymorphs in coal. First, there are about 345 known structural models of coal in the main-stream literature since 1942 and 18 of them have been validated recently with the most updated and reliable scientific data from known coal analyses [27-29], and none of these 18 validated models indicate the presence of multiple nano-carbon polymorphs in coal. In fact, these 18 models, as shown in FIG. 3, consistently imply the presence of nano-graphene with a short-range-order resembling the crystalline structure of graphene, and with a graphene-domain of 1-2 nm across the basal-plane and at the most 2-3 basal-plane layers. Second, in the large volume of literature about experimental studies of coal including anthracite, abundant data from XRD and TEM also consistently conclude the presence of nano-size graphene-like domains of 1-2 nm across the basal-plane and 1-3 basal-plane layers. Third, the recent discoveries of nano-graphene in coal by Tour et al. and other groups, also show nano-graphene domains of 1-2 nm across the basal-plane and 1-3 basal-plane layers. These recent discoveries further reinforce the perception that only nano-graphene, with no other nano-carbon polymorphs, is present in coal and can be produced from coal.

Nevertheless, scarce pieces of information on coal hint the presence of some of the common nano-carbon polymorphs shown in FIG. 1, other than nano-graphene. For example, a high resolution TEM image of nearly half of a carbon nano-onion is revealed in the study of using lithium to violently reduce anthracite by Sun et al. [30]. No details were given by Sun et al. regarding the exact anthracite treatment prior to the TEM imaging. Nevertheless, in the section showing the image of carbon nano-onion, Sun et al. said "exfoliation of anthracite has been investigated and shown that strong oxidants are required" [30]. This casts some uncertainty if the presence of carbon nano-onion is natural or artificial. On the other hand, a report on TEM [31] dated to 1965 shows the presence of well-crystallized and relatively large nano-graphite with an average domain-size of 80 nm in meta-anthracite samples taken from the Leoben coal-field in Austria. Unfortunately, the TEM imaging clarity was not good enough in 1965 to pin the presence of multiple nano-carbon polymorphs. Since then, no relevant data have been reported except the works of Kumanek et al. [32] in 2018 on thermally treated anthracite. There, a high resolution TEM image of an alleged-anthracite sample taken from the Doneck Basin (Donbas) coal-field of Svierdlovski in Ukraine was shown. Although the authors did not pay any attention to the detailed structure in this image, Applicants of the present disclosure opine that the image reveals the presence of multiple nano-carbon polymorphs. Interestingly, Kumanek et al. [32] also reported that the sample had an extremely high carbon content of 95% by weight. A careful track of coal from the Donbas coal-field reveals that Donbas is well known for its rich meta-anthracite reserve and the Donbas meta-anthracite typically has a carbon content of 94-95% [33]. From all known data on anthracite, the carbon contents are typically 91-93% and are certainly lower than 95%. Hence, a verdict can be reached that Kumanek et al. [32] erroneously referred metal-anthracite of the Donbas coal-field to anthracite. In short, speculative evidence of the presence of multiple nano-carbon polymorphs in coal, particularly in meta-anthracite, is hidden in several past reports despite the fact that the main-stream literature is against the contemplation of such presence.

The science governing the formation of multiple nano-carbon polymorphs in anthracite and meta-anthracite is further explained in this section. Thermodynamically, coal is not as stable as graphite; as such, coal can be fully graphitized at around 3000° C. Such a high temperature is required because the phase transformation is blocked by an extremely high energy barrier of about 1000 kJ/mol [11, 32-35]. Experimentally, the formation of intermediate precursors of graphite as a function of energy input in the slow graphitization process has been tracked by several groups [32, 34, 35]. In general, multiple nano-carbon polymorphs emerge during thermal treatments around 1000° C. [34,35]. The temperature threshold of this onset of phase transformation decreases to around 300-900° C. when press or shear is applied. On earth, natural formation of meta-anthracite and graphite are facilitated by both temperature and stress in the processes of coalification and graphitization. As such, the feasibility of searching and extracting multiple nano-carbon polymorphs from coal are supported by the global presence of coal-fields which have experienced transient geological rises in pressure and temperature, such as about 0.3-0.6 GPa and 300-1000° C. Typically, meta-anthracite is found in these coal fields. Therefore, the present disclosure scientifically clarifies that multiple nano-carbon polymorphs are precursors for the formation of micro-graphite and graphite.

The most cost-effective and environmental-friendly way to produce nano-carbon polymorphs is thus to extract them from anthracite and meta-anthracite because these nanomaterials are naturally present in these coal sources. Alternatively, low-rank coal can be modified with thermal processes around 1000° C. in atmospheric pressure or around 500° C. under press and shear to improve the yield in producing multiple nano-carbon polymorphs; but these energy-demanding processes are costly and noncompliant to the principles of green chemistry and engineering. The formation and production of nano-carbon polymorphs from coal-derivatives produced by any means of carbonized or graphitized processes which are typically noncompliant to the principles of green chemistry and engineering are different from the contents of the present disclosure and are rejected by the present disclosure.

In the coal industry, the extraction of coal constituents typically begins with the pulverization and sieve of coal into appropriate coal powder as a function of powder-size. The typical powder-size for starting the extraction processes in the present disclosure is around 50-500 microns.

To further break down the primary pulverized coal powder to fine particles and ultrafine particles, wet-comminution and dispersion are adopted to prevent health hazard and environmental pollution imposed by processing dry powder in such powder sizes. Practical techniques and production equipment are readily available for these processes. Particularly, technology advancements and market demands have already enabled the successful production of nano-dispersions of drugs and pesticides in industry, with adequate machines facilitating wet-comminution and dispersion for laboratory-based R&D and for mass production [36]. Relatively safe surfactants and stabilizers have also been developed and accepted in the trade. In the known practices [36], milling beads of down to 0.05 mm have been newly introduced to the market and adopted to mill carbofuran, as a pesticide, down to 29 nm. In the present disclosure, coal constituents are grinded down below 10 nm with the innovative adoption of grinding grits as small as 10 nm to drive the required nano-comminution. Such grinding grits are readily available at low cost in the trade of metallurgy and nanotechnology. The grit composition chosen by the present disclosure is alumina which is commonly present in coal as a mineral constituent. While most fragments of anthracite and meta-anthracite are hydrophobic, alumina is hydrophilic; hence, recycling alumina from the nano-dispersion production is relatively easy and inexpensive.

The technology and production-equipment for separating and sorting coal constituents are well established and readily available. Various filtration separation techniques for nanomaterials processing, including dialysis and cross-flow ultrafiltration, have been used successful in the health-care industry for separating and sorting nano-biomaterials, and is adopted in the present disclosure.

In the following section, some embodiments are given and explained to further illustrate the technical details of the present disclosure.

In some embodiments, the present disclosures pertain to processes of producing various forms of multiple nano-carbon polymorphs from coal comprising anthracite, meta-anthracite, semi-graphite, and combinations thereof. In the coal industry, anthracite, meta-anthracite, and other coal materials like anthracite are classified under ISO 11760 as Anthracite A, Anthracite B, and Anthracite C. In some embodiments, Anthracite C under the ISO 11760 coal classification is selected for the production of multiple nano-carbon polymorphs comprising nano-graphene as the main polymorphs and with other polymorphs as shown in FIG. 1 as minor polymorphs. In some embodiments, Anthracite A under the ISO 11760 coal classification is selected for the production of multiple nano-carbon polymorphs comprising nano-graphene as minor polymorphs and with other polymorphs as shown in FIG. 1 as major polymorphs. In some embodiments, Anthracite A, Anthracite B, Anthracite C, and combinations thereof are selected as the coal source for the production of multiple nano-carbon polymorphs.

Figure 2:
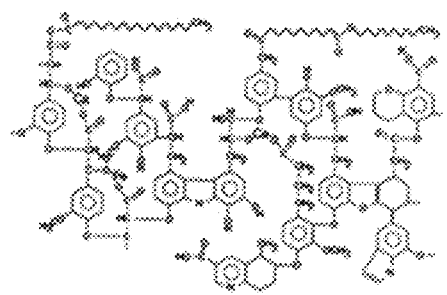
FIG. 2 The eighteen molecular models of coal as recently validated by Zhou et al. [29].
Figure 2:
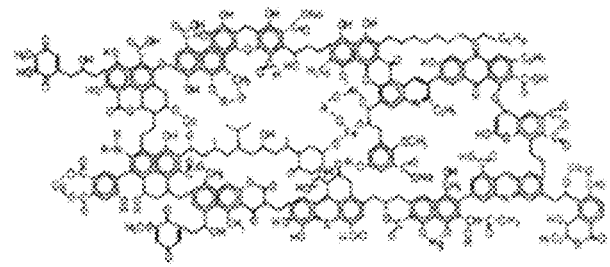
Figure 2:
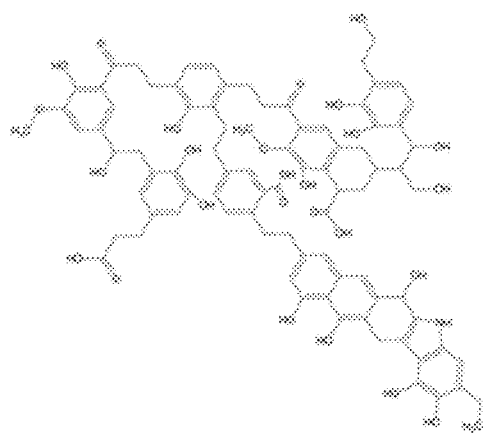
Figure 2:
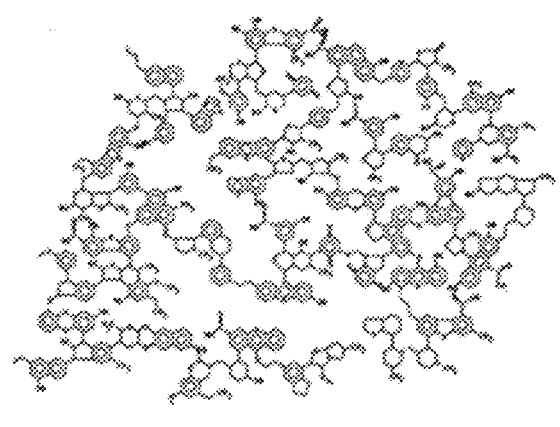
Figure 2:
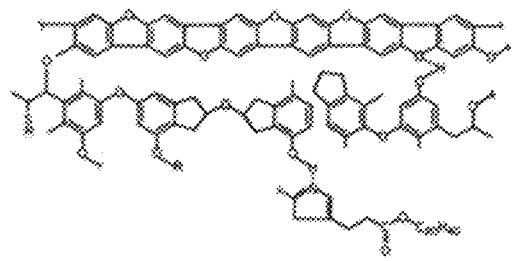
Figure 2:
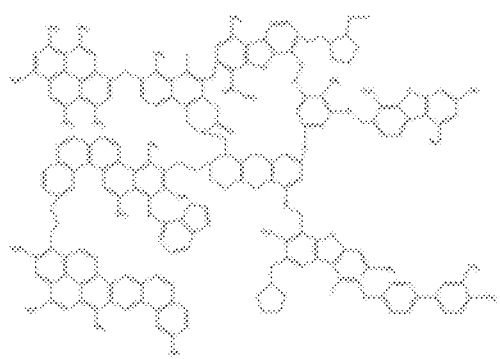
Figure 2:
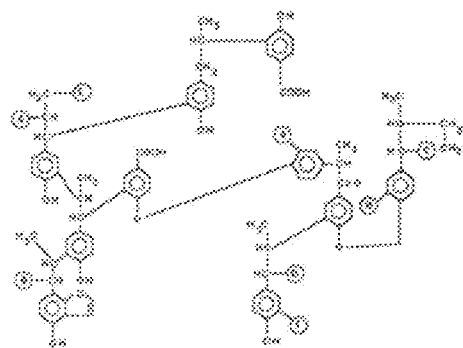
Figure 2:
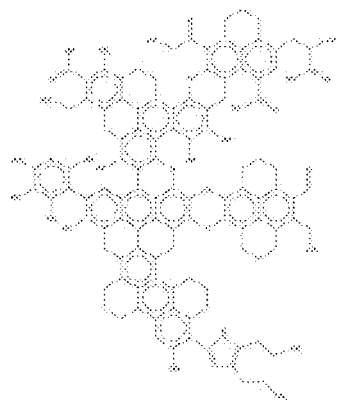
Figure 2:
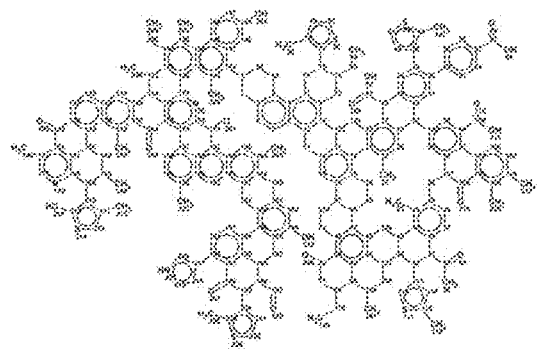
Figure 2:
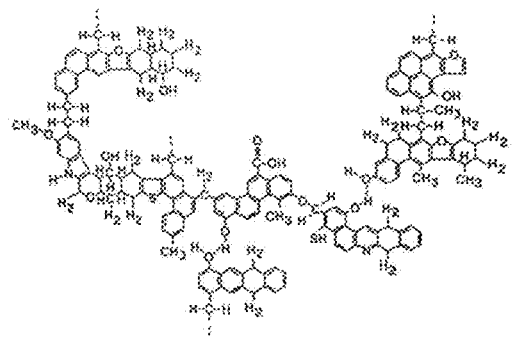
Figure 2:
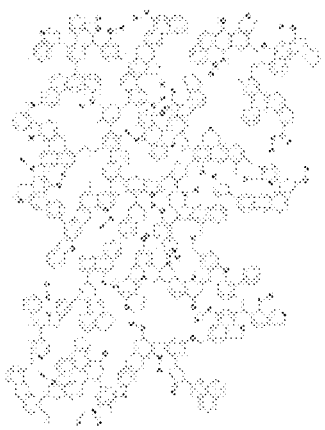
Figure 2:
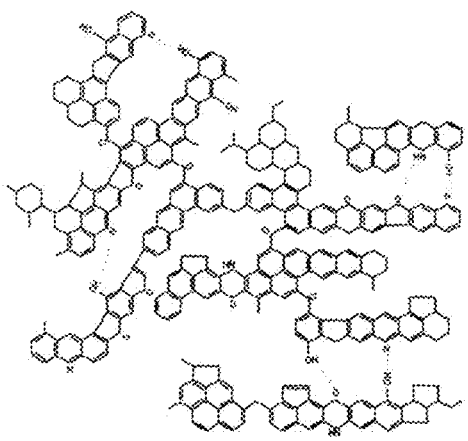
Figure 2:
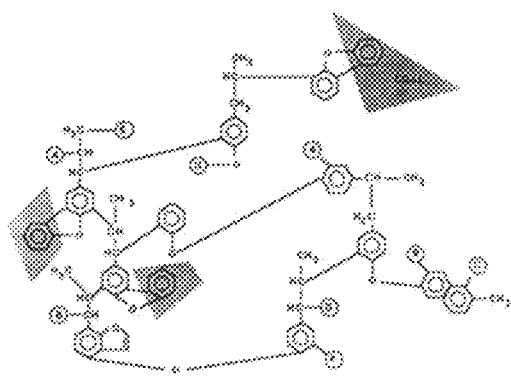
Figure 2:
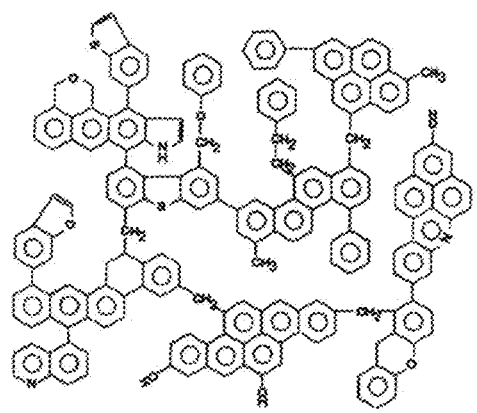
Figure 2:
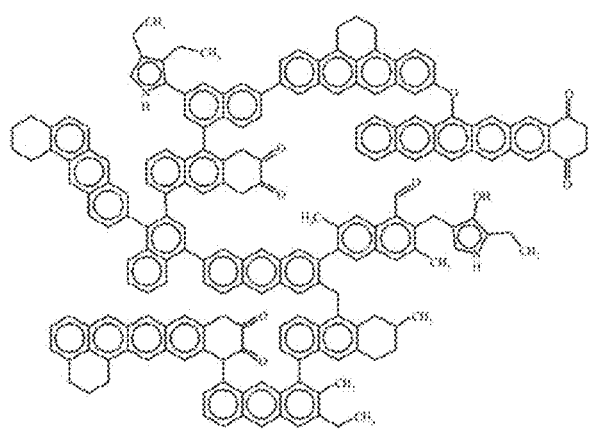
Figure 2:
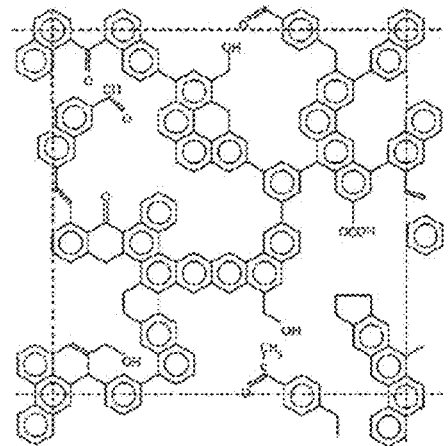
Figure 2:
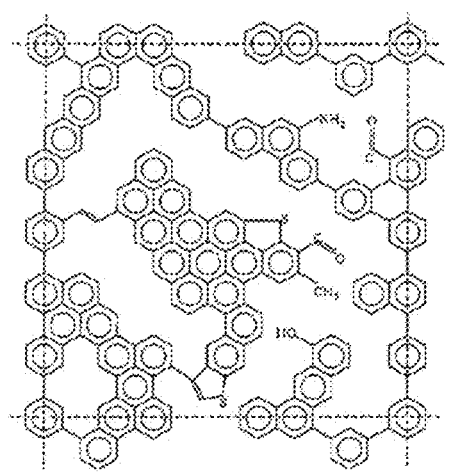
Figure 2:
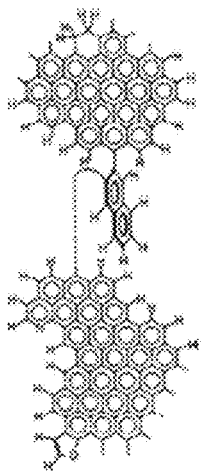

In some embodiments, the method of the present disclosure involves, as shown in FIG. 2, the proper selection of a coal source and the comminution and dispersion of the coal source to various products comprising nano-carbon polymorphs. In some embodiments, the method involves pulverizing and sieving the coal source into coal powder of proper sizes for the production of nano-carbon polymorphs. In some embodiments, the coal source is pulverized and sieved to 50-500 microns. In some embodiments, the coal source is pulverized and sieved to 50-100 microns. In some embodiments, flotation processes are used to separate residual minerals from organic coal constituents. In some embodiments, hydrodynamic cavitation is integrated with flotation to reduce energy consumption and to optimize the performance of flotation separation. In some embodiments, other float-sink processes are used to separate residual minerals from organic coal constituents. In some embodiments, wet-comminution and dispersion processes are used to reduce the particulate size of the coal powder for the production of nano-carbon polymorphs. In some embodiments, multiple cycles of comminution plus separation, with separation comprising flotation separation, float-sink separation and combinations thereof, are used for increasing the yield and reducing the energy and chemical consumption in the production of nano-carbon polymorphs.

In some embodiments, surfactants and stabilizers are added in the wet-comminution processes and the separation processes for improving the yield of comminution and dispersion, and for reducing energy consumption in these processes with the maintenance of their high yields. In some embodiments, common and safe surfactants and stabilizers widely accepted by both industrial users and environmental protection agencies are used. In some embodiments, surfactants and stabilizers comprising tetrahydrofurfuryl ester, ethoxylated alcohols, alkyl sulfates, alkyl carboxylates, poloxamer, polysorbate, polyvinylpyrrolidone, and combinations thereof are used.

In some embodiments, dry pulverized coal powder is dispersed and comminuted by common wet milling processes using milling beads [36]. In some embodiments, the coal powder is wet-milled with zirconia milling beads. In some embodiments, the coal powder is wet-milled to 100-500 nm with milling beads. of 100-500 microns. In some embodiments, the coal powder is wet-milled to 20-300 nm with milling beads of 10-100 microns.

In some embodiments, the coal powder is wet-comminuted with the trade-marked technology of FILMIX which is at present marketed globally by the PRIMIX Corporation in Japan. Briefly, a powder slurry is placed in a mixer comprising a turbine spinning at high speed along the axis of a cylindrical container. The centrifugal force concentrates the particulates in the slurry to the wall of the cylindrical vessel. A film is thus formed in which crowded particulates are pressed and sheared [U.S. Pat. No. 5,582,484]; as such, comminution is accomplished. The FILMIX technology has actually been exploited for the comminution and dispersed coal in water [U.S. Pat. No. 9,574,151B2] to a particle size-mode of about 200-300 nm, for enhancing the combustion efficiency of coal. In the present disclosure, modified FILMIX techniques are revealed for the production of multiple nano-carbon polymorphs from coal, with polymorphs as small as 1-2 nm. In some embodiments, coal powder is directly wet-comminuted and dispersed in a FILMIX mixer for the production of multiple nano-carbon polymorphs with a particle-size of 100-1000 nm. In some embodiments, a mixture of coal powder and nano-grinding-grits is wet-comminuted and dispersed in a FILMIX mixer for the production of multiple nano-carbon polymorphs with polymorphs as small as 1-2 nm. In some embodiments, a mixture of coal powder and nano-grinding-grits of 10-100 nm is used in conjunction with a FILMIX mixer for the production of multiple nano-carbon polymorphs with polymorphs as small as 1-2 nm. In some embodiments, coal powder is wet-comminuted and dispersed by this method integrating FILMIX with nano-grit-grinding, by the common wet-milling technology with milling beads, and by combinations thereof, to optimize the yield and reduce the energy consumption and environmental load in the production of nano-carbon polymorphs with polymorphs as small as 1-2 nm.

In some embodiments, the present disclosure pertains to processes of making products comprising nano-carbon polymorphs with other coal constituents as additives, for industrial applications requiring such mixtures. In some embodiments, such processes involve first the partition of the coal source to its mineral constituents, aliphatic organic constituents comprising amorphous organic polymers, and aromatic organic constituents comprising multiple nano-carbon polymorphs. Then, these partitioned extracts are mixed to form the application-oriented products. In some embodiments, such partition processes are partly omitted or totally omitted in order to yield a mixture of these coal constituents with the best functional performance for a specific engineering application. All these embodiments are developed with the common goal of increasing the yield and reducing the energy and chemical consumption in the production of application-specific formulations comprising nano-carbon polymorphs with appropriate additives. In some embodiments, application-specific formulations comprising nano-carbon polymorphs with appropriate additives are made for the production of new cement composites comprising multiple nano-carbon polymorphs for optimizing the performance of cements and concretes at low cost. In some embodiments, application-specific formulations comprising nano-carbon polymorphs with appropriate additives are made for the production of new polymer composites comprising multiple nano-carbon polymorphs for optimizing the performance of the new polymer composites at low cost. In some embodiments, such new polymer composites are rubber composites. In some embodiments, application-specific formulations comprising nano-carbon polymorphs with appropriate additives are made for the production of metal composites comprising multiple nano-carbon polymorphs for optimizing the performance of metal and alloy at low cost. In some embodiments, application-specific formulations comprising nano-carbon polymorphs with appropriate additives are made for the production of ink composites comprising multiple nano-carbon polymorphs for optimizing the ink performance for printing and 3D printing applications at low cost.

In one embodiment of the present disclosure, anthracite (Anthracite C in accord to the ISO011760 classification) with a carbon content (dry ash free basis) of 89-93% by weight and mean random vitrinite reflectance of 2.0-3.0% is pulverized to about 100 microns. Multiple steps of wet comminution are applied. Between these wet-comminution and dispersion processes, flotation and float-sink techniques are used to separate hydrophilic and high-density mineral particles from the organic coal constituents. Finally, the organic coal extract is mixed with alumina grits of 10-100 nm and wet-comminuted with the modified FILMIX method precedingly described. Again, flotation and float-sink techniques are used to separate low-density aliphatic coal-constituents from high-density nano-carbon graphitic polymorphs. In this case of anthracite processing, the main extract-products are nano-dispersions of nano-graphene-disks with average size of 1-2 nm in diameter and 1 nm in thickness. Minority extract-products are nano-dispersions of other nano-carbon polymorphs with different shapes and larger sizes. Low-density aliphatic coal constituents are sorted as ink additives and other nanotechnology applications.

In another embodiment of the present disclosure, meta-anthracite (Anthracite A in accord to the ISO11760 classification) with a carbon content (dry ash free basis) of 93-97% by weight and mean random vitrinite reflectance of 4-6% is pulverized to about 100 microns. Multiple steps of wet comminution are applied. Between these wet-comminution and dispersion processes, flotation and float-sink techniques are used to separate hydrophilic and high-density mineral particles from the organic coal constituents. Finally, the organic coal extract is mixed with alumina grits of 10-100 nm and wet-comminuted with the modified FILMIX method precedingly described. Again, flotation and float-sink techniques are used to separate low-density aliphatic coal-constituents from high-density nano-carbon graphitic polymorphs. In this case of anthracite with a low reflectance, the product mixes are like those of Anthracite C as shown in the preceding embodiment descriptions. For meta-anthracite with a high reflectance, the majority extract-products are nano-dispersions mainly comprising nano-carbon polymorphs including carbon nano-fibers multi-wall carbon nanotubes, carbon nano-onions, and nano-graphite-plates. Nano-dispersions mainly comprising nano-graphene-disks with average size of 1-2 nm in diameter and 1 nm in thickness are also produced as minority products. Low-density aliphatic coal constituents are sorted as ink additives and other nanotechnology applications.

In another embodiment of the present disclosure, Anthracite B in accord to the ISO11760 classification) with a carbon content (dry ash free basis) of 90-95% by weight and mean random vitrinite reflectance of 3.0-4.0 is pulverized to about 100 microns. Multiple steps of wet comminution are applied. Between these wet-comminution and dispersion processes, flotation and float-sink techniques are used to separate hydrophilic and high-density mineral particles from the organic coal constituents. Finally, the organic coal extract is mixed with alumina grits of 10-100 nm and wet-comminuted with the modified FILMIX method precedingly described. Again, flotation and float-sink techniques are used to separate low-density aliphatic coal-constituents from high-density nano-carbon graphitic polymorphs. In this case of anthracite with a low reflectance, the product mixes are like those of Anthracite C as shown in the preceding embodiment descriptions. For anthracite with a high reflectance, the majority extract-products are nano-dispersions mainly comprising nano-carbon polymorphs including carbon nano-fibers, multi-wall carbon nanotubes, carbon nano-onions and nano-graphite-plates. Nano-dispersions mainly comprising nano-graphene-disks with average size of 1-2 nm in diameter and 1 nm in thickness are also produced as minority products. Low-density amorphous coal constituents are sorted as ink additives and other nanotechnology applications.

EXAMPLES

By way of non-limiting illustration, examples of certain specific embodiments of the present disclosure are given below.

Example 1

The Production of Multiple Nano-Carbon Polymorphs by Grinding Coal with Coal

Figure 4:
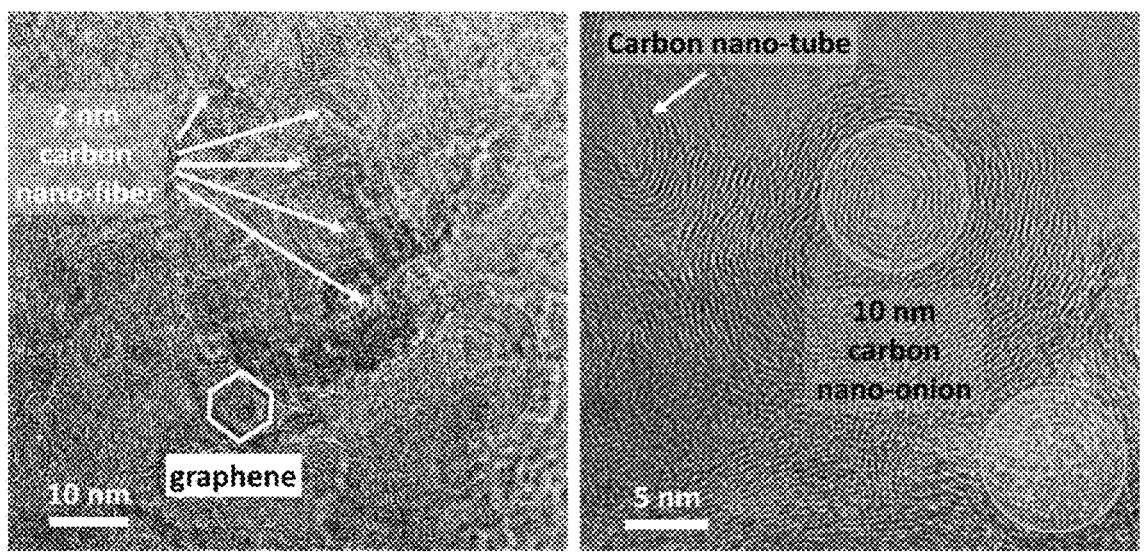

Some preceding embodiment descriptions of multiple nano-carbon polymorphs by wet-comminution of coal, with no grinding beads nor grinding grits, to nano-dispersions is validated in this first example. Here, a piece of Anthracite A under the ISO 11760 classification was split to two pieces. The two pieces were pressed and sheared against each other in water by hand repetitively to form a diluted slurry. A drop of the diluted slurry was placed on a TEM grid. Two high resolution TEM (HRTEM) images of a nano-grain of coal on this grid are shown in FIG. 4. The HRTEM images clearly confirm the presence of a mixture of turbostratic carbon nano-crystals in this nano-grain of coal. More specifically, the presence of several carbon nano-onions, many carbon nano-fibers, an imperfect multiwall carbon nano-tube, and a hexagonal nano-graphene-disk are evident. Their presences are identified by their shapes and by their lattice fringes with lattice spacing of 0.32-0.39 nm. These lattice fringes are stacks of basal planes of turbostratic graphite. The chemical elemental identification by energy dispersive X-ray spectroscopy in the scanning TEM mode also confirms the presence of carbon.

This example demonstrates that coal is soft and brittle enough to chip off nano-grains in a simple pressing and shearing process involving two pieces of coal in water without any chemical additives and reagents. HRTEM unambiguously shows the presence of multiple nano-carbon polymorphs comprising some carbon nano-onions and abundant carbon nano-fibers, with a few nano-graphene-disks and multiwall carbon nano-tubes, in such nano-grains.

Example 2

Figure 5:
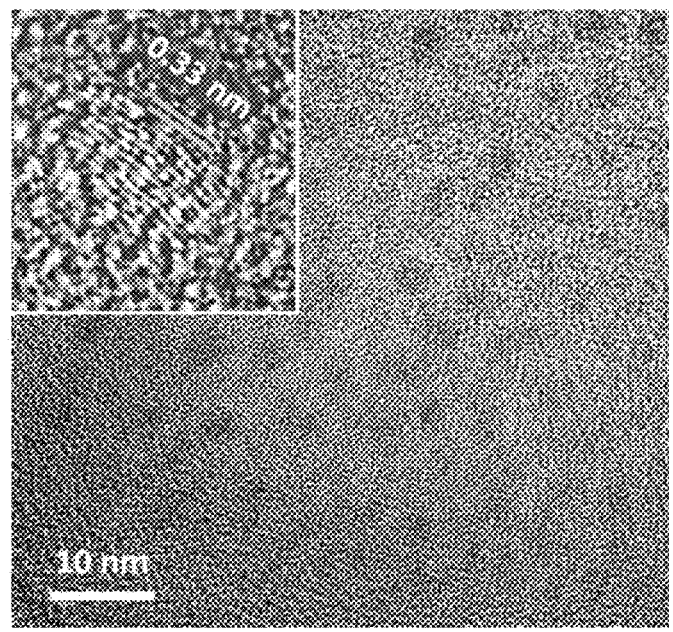
FIG. 5 A high resolution TEM (HRTEM) image of a nano-carbon polymorph present in the hexane extract prepared by adding hexane to the aqueous colloid from simple grinding a piece of coal with 50 nm alumina-grits. The presence of abundant nano-carbon graphitic-polymorphs with an average size of about 2 nm is evident. The diffraction signals fit the carbon crystal structure known as PDS #046-943 in the database released under the Joint Committee on Powder Diffraction Standards. The most intense diffraction signals are attributed to the presence of repetitive lattice planes with an average lattice spacing of 0.32 nm.

The Production of Multiple Nano-Carbon Polymorphs by Grinding Coal with Nano-Grits of Alumina Some preceding embodiment descriptions of multiple nano-carbon polymorphs by wet-comminution of coal, with grinding beads or grinding grits, to nano-dispersions is validated in this second example. Here, a grain of coal powder milled from a piece of Anthracite C under the ISO 11760 classification was simply wet-comminuted with 50 nm alumina grinding-grits in a mortar by hand to form a diluted slurry. Some of the slurry was placed in a test tube and hexane was mixed with the slurry to finally form two layers of immiscible liquids. A drop of the hexane extract was placed on a TEM grid. The high resolution TEM (HRTEM) image of a nano-grain of coal on this grid is shown in FIG. 5. This TEM image clearly shows the presence of abundant nano-carbon graphitic-polymorphs with an average size of about 2 nm. The diffraction signals fit the carbon crystal structure known as PDS #046-943 in the database released under the Joint Committee on Powder Diffraction Standards. The most intense diffraction signals are attributed to the presence of repetitive lattice planes with an average lattice spacing of 0.33 nm which matches the lattice spacing of graphitic basal-planes. The chemical elemental identification by energy dispersive X-ray spectroscopy in the scanning TEM mode confirms the presence of carbon.

This set of data confirms the presence of nano-graphene disks in coal. Although they are found with little perturbation of their natural occurrence in coal, their morphologies and structures are very much like those reported by Tour et al. [12-16; U.S. Pat. No. 9,919,927] and their followers [17-26] who treated coal with very strong oxidants. The similarity may be due to the fact that in the basic molecular structure of coal characterized by all these groups, as shown in the bottom of FIG. 2, stacks of nano-graphene with basal-plane of 1-2 nm in size are present. The morphologies and shapes of nano-graphene are not fundamentally altered, no matter whether the extraction processes are destructive oxidation of non-graphitic constituents or mild physical cleavages of weak links between nano-constituents.

Figure 6:
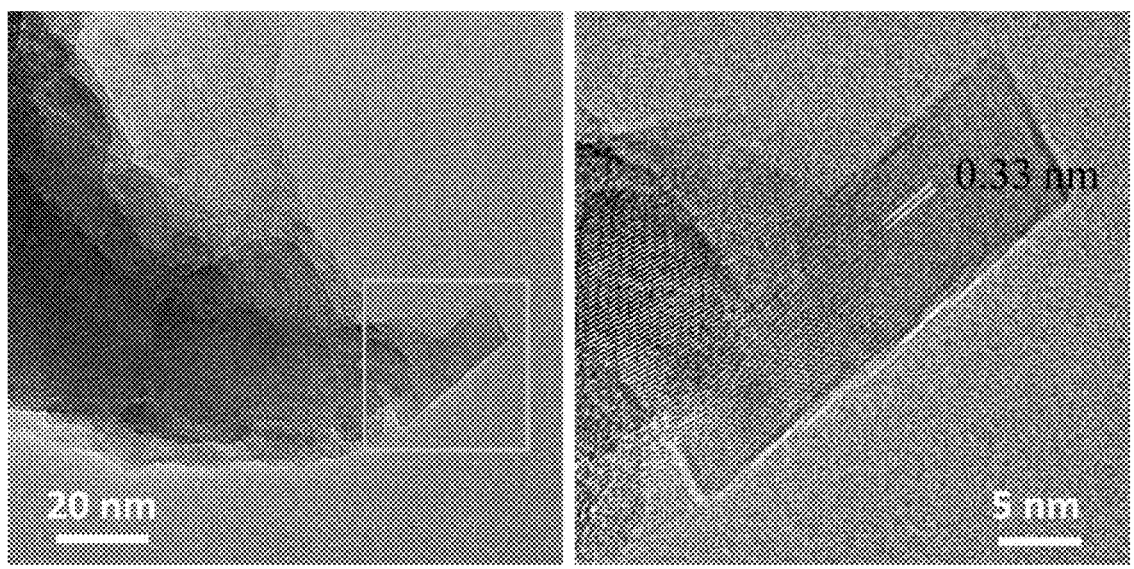
FIG. 6 A high resolution TEM (HRTEM) image of a nano-carbon polymorph present in the hexane extract prepared by adding hexane to the aqueous slurry which was prepared by simple grinding a piece of coal with 50 nm alumina-grits. The nano-carbon graphitic-polymorph was present amid an amorphous carbon grain with the chemical elemental identification confirmed by energy dispersive X-ray spectroscopy in the scanning TEM mode. The lattice imaging picture shows graphite basal-planes packed vertically into a rectangular graphitic carbon nano-crystal (about 6 nm×25 nm). The average lattice spacing is 0.33 nm.

When another drop of the hexane extract was placed on a TEM grid, a different scenario was observed as shown in FIG. 6. The HRTEM image in this figure clearly shows the presence of a nano-carbon graphitic-polymorph amid an amorphous grain. The chemical elemental identification by energy dispersive X-ray spectroscopy in the scanning TEM mode confirms the presence of carbon. The lattice imaging picture shows a stack of graphite basal-planes packed vertically into a rectangular graphitic carbon nano-crystal (about 6 nm×25 nm). The thickness of the crystal in the viewing direction is about 1-2 nm. The average lattice spacing in the basal-plane stack is 0.33 nm.

The HRTEM image clearly confirms the presence of a nano-graphite-plate in coal. In the perspective of materials microstructural analysis, the observed nano-graphite-plate is very much different from nano-graphene. The explicit difference is that the nano-graphite-plate comprises a stack of about 20 graphitic basal-planes with each basal-plane having a peculiar rectangular shape of about 25 nm×2 nm. Such a stack of long and narrow graphitic basal-planes is most likely hetero-epitaxially grown on a piece of mineral crystal facet with the facet lattice matching closely with the lattice of the growth front of the observed nano-graphite. The hetero-epitaxial growth must have been driven by appropriate hydrothermal activation for local graphitization of minute organic remains pressed between two closely packed mineral crystal facets in the long process of coalification. The mineral growth-substrates were than leached and consumed; this leaves the lone nano-graphite-plate embedded in a matrix of amorphous carbon in coal.

When a drop of the aqueous extract in this example was placed on a TEM grid, many nano-crystals of alumina were found and imaged. This set of data and those data from the hexane extract collectively corroborate that the hydrophobic (nonpolar) organic constituents of coal can be easily separated from the hydrophilic (polar) mineral impurities in coal.

The experimental TEM images of the nano-carbon polymorphs shown in Examples 1 and 2 clearly support the assertion of the present disclosure regarding the presence of multiple nano-carbon polymorphs in coal. More importantly, these images of the nano-carbon polymorphs with atomic resolution, together with the molecular models shown in FIG. 2, also depict graphically that most nano-carbon polymorphs are macro-molecules with aromatic molecular domains binding with neighboring coal constituents by van der Waals bonds and other physical adhesive interactions. As such, extracting these nano-carbon polymorphs from coal through energy-demanding and violent chemical-dissociation of strong covalent bonds in coal is both illogical and wasteful. The production of nano-carbon polymorphs from coal can be simply facilitated by solvation and dispersion, with physical agitation and comminution. These Examples and experimental results thus also support the present disclosure regarding the feasibility and practicality of producing multiple nano-carbon polymorphs from coal with physical and green processes.

TEM measurements were also performed on wet-comminuted Anthracite A, with dark-field imaging of nano-carbon polymorphs in comminuted grains of such coal samples. TEM dark-field imaging has been used to find the locations of graphitic crystalline carbon in coal [34,35]. Under dark-field imaging, nano-carbon polymorphs are bright in contrast and the amorphous carbon constituents are dark. This approach eases the statistical pattern-recognition analysis of the concentration of crystalline nano-carbon polymorphs in the background presence of amorphous carbon in coal [34,35]. The relevant data in the literature [34,35] and the experimental results obtained by Applicants of the present disclosure all consistently support that coal sources identified as highly mature coal with their coal ranks between meta-anthracite (Anthracite A under ISO 11760) and semi-graphite typically have an extremely high carbon concentration (over 90% by weight), an extremely high ratio of aromatic carbon to aliphatic carbon, a relative high mean random vitrinite reflectance of over 6%, and abundant nano-carbon polymorphs with their overall concentration over 50% of all carbon in the coal sources. The present disclosure reveals such criteria and processes for selecting the proper sources of coal for the most cost-effective production of multiple nano-carbon polymorphs from coal.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method for extracting from coal more than one nano-carbon polymorph, wherein the method uses no oxidation nor any chemical etch but uses environmentally friendly processes comprising:
   selecting a proper coal source;
   dry mechanical pulverizing the selected coal;
   float-sink separating organic constituents from inorganic mineral constituents;
   wet-comminution of the separated organic constituents to 200-1000 nm with no grinding grit;
   follow-up wet-comminution of the sub-micron comminuted organic constituents, with the assistance of grinding agents, to yield nano-carbon polymorphs smaller than-100 nm;
   sorting the nano-carbon polymorphs and amorphous organic nano-constituents to produce sorted nano-dispersions;

blending the sorted nano-dispersions comprising different coal constituents into an application-specific formulation as a custom-made high-performance product.

2. The method of claim 1, wherein the nano-carbon polymorphs comprise carbon nano-fibers, carbon nano-tubes, carbon nano-onions, nano-graphene, nano-graphite-plates, or a combination thereof.

3. The method of claim 1, wherein the nano-carbon polymorphs are sphere-like with a diameter of 1 nm-50 nm, flake-like with a thickness of not more than 2 nm and an edge-size of not more than 100 nm, thread-like with a cross-section dimension of not more than 20 nm and a length of not less than 50 nm, or a combination thereof.

4. The method of claim 1, wherein the nano-carbon polymorphs comprise carbon with a concentration of more than 90% by weight.

5. The method of claim 1, wherein the nano-carbon polymorphs display diffraction features and comprise crystalline or turbostratic-crystalline structures.

6. The method of claim 1, wherein the nano-carbon polymorphs have a density of 1.5-2.1 $g/cm^3$.

7. The method of claim 1, wherein the coal is selected from the group consisting of anthracite, meta-anthracite, semi-graphite, combinations thereof, or coal with a mean random vitrinite reflectance of 3-10%.

8. The method of claim 1, wherein dry mechanical pulverizing the selected coal comprises milling, grinding, or milling and grinding the selected coal, and a size of the pulverized selected coal ranges from 50 to 500 microns.

9. The method of claim 1, wherein the wet comminution comprises solvation, dispersion, and comminution in a liquid medium with surfactants and dispersion-stabilizers to solvate and disperse the pulverized selected coal into nano-dispersions.

10. The method of claim 9, wherein the liquid medium comprises water, an alkanol, glycerol, ethylene glycol, propylene glycol, an ionic liquid, an alkane, an ether, carbon tetrachloride, or a combination thereof.

11. The method of claim 9, wherein the surfactants and dispersion-stabilizers comprise tetrahydrofurfuryl ester, ethoxylated alcohols, alkyl sulfates, alkyl carboxylates, poloxamer, polysorbate, polyvinylpyrrolidone, or a combination thereof.

12. The method of claim 9, wherein the wet comminution is conducted with a high-speed spinner or a mixer.

13. The method of claim 1, wherein the grinding agents in the follow-up wet-comminution comprise grinding grits of alumina, silica, or yttrium-stabilized zirconia.

14. The method of claim 1, wherein float-sink separating the organic constituents comprises using liquid media comprising a $ZnCl_2$ aqueous-solution, an alkane, carbon tetrachloride, pyridine, chloroform, an ether, an alkanol, or a combination thereof.

15. The method of claim 1, wherein sorting the nano-carbon polymorphs comprises filtration for extracting particulates of 1-5 nm, 5-10 nm, 10-30 nm, 30-50 nm, 50-100 nm, or a combination thereof.

16. The method of claim 1, further comprising separating the nano-carbon polymorphs and other constituents of the dry mechanical pulverized coal by differentiation in density and wettability.

17. The method of claim 1, further comprising extracting the nano-carbon-polymorphs from the coal, with each extract comprising (i) a distribution of polymorph composition, shape, and size, and (ii) a dry powder, a slurry, a colloid, a composite, or a combination thereof.

18. The method of claim 1, wherein the application-specific formulation is utilized in cement-modification, concrete-modification, production of nano-particulate-reinforced composites, production of inks for 3D printing, production of coatings, production of lubricants, production of batteries, or a combination thereof.

19. The method of claim 17, wherein remaining constituents of the coal after extracting the nano-carbon polymorphs are utilized in production of chemicals, construction materials, or energy.

20. The method of claim 1, wherein separating the organic constituents comprises float-sink hydrodynamic cavitation in a flotation column.

* * * * *

UNITED STATES PATENT AND TRADEMARK OFFICE
CERTIFICATE OF CORRECTION

| | | Page 1 of 1 |
|---|---|---|
| PATENT NO. | : 11,772,972 B2 | |
| APPLICATION NO. | : 17/274784 | |
| DATED | : October 3, 2023 | |
| INVENTOR(S) | : Leo Woon Ming Lau et al. | |

It is certified that error appears in the above-identified patent and that said Letters Patent is hereby corrected as shown below:

On the Title Page

Item (73), Assignee, change "HL Science & Technology Limited, Hong Kong (CN)" to --Foshan HL Science & Technology Limited, Foshan (CN)--.

Signed and Sealed this
Ninth Day of September, 2025

Coke Morgan Stewart
*Acting Director of the United States Patent and Trademark Office*